(12) United States Patent  
Kwon et al.

(10) Patent No.: US 12,537,137 B2  
(45) Date of Patent: Jan. 27, 2026

(54) MULTILAYER ELECTRONIC COMPONENT

(71) Applicant: SAMSUNG ELECTRO-MECHANICS CO., LTD., Suwon-si (KR)

(72) Inventors: Hyung Soon Kwon, Suwon-si (KR); Hyoung Uk Kim, Suwon-si (KR); Han Seong Jung, Suwon-si (KR); Ji Su Hong, Suwon-si (KR); Hye Won Ryoo, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 126 days.

(21) Appl. No.: 18/519,370

(22) Filed: Nov. 27, 2023

(65) Prior Publication Data

US 2024/0290543 A1    Aug. 29, 2024

(30) Foreign Application Priority Data

Feb. 28, 2023   (KR) .......................... 10-2023-0026712

(51) Int. Cl.
  *H01G 4/30*      (2006.01)
  *H01G 4/008*     (2006.01)
  (Continued)

(52) U.S. Cl.
  CPC .............. *H01G 4/30* (2013.01); *H01G 4/008* (2013.01); *H01G 4/012* (2013.01); *H01G 4/1209* (2013.01)

(58) Field of Classification Search
  CPC ......... H01G 4/30; H01G 4/012; H01G 4/1209
  See application file for complete search history.

(56) References Cited

U.S. PATENT DOCUMENTS 9,064,636 B1 *   6/2015   Sugita ...................... H01G 4/12  
11,776,749 B2 *  10/2023  Uchida ................... H01G 4/012  
                                                          361/301.4

(Continued)

FOREIGN PATENT DOCUMENTS

JP     2002299145 A  * 10/2002  
JP     2013-021010 A    1/2013

(Continued)

OTHER PUBLICATIONS

T. Tsurumi et al., "Multi-layered Ceramic Capacitors", Handbook of Advance Ceramics: Chapter 6.1, Edition 2.

(Continued)

*Primary Examiner* — Timothy J. Dole  
(74) *Attorney, Agent, or Firm* — MORGAN, LEWIS & BOCKIUS LLP

(57) ABSTRACT

A multilayer electronic component includes a body including a dielectric layer and an internal electrode disposed alternately with the dielectric layer in a first direction, and an external electrode disposed on the outside of the body and connected to the internal electrode. The dielectric layer includes a first layer and a second layer stacked in the first direction, and each of the first layer and the second layer includes Ba, Ti, and Si. $1.5 \leq S2/S1 \leq 3.0$ is satisfied, when a molar ratio of Si to Ti included in the first layer is referred to as S1 and a molar ratio of Si to Ti included in the second layer is referred to as S2.

17 Claims, 5 Drawing Sheets

(51) Int. Cl.
  *H01G 4/012*   (2006.01)
  *H01G 4/12*    (2006.01)

(56) References Cited

U.S. PATENT DOCUMENTS

| | | |
|---|---|---|
| 2004/0233612 A1 | 11/2004 | Sugimoto et al. |
| 2006/0177678 A1 | 8/2006 | Iwanaga |
| 2009/0059471 A1 | 3/2009 | Fukuda et al. |
| 2009/0225494 A1* | 9/2009 | Yamazaki ......... C04B 35/62815 |
| | | 156/89.14 |
| 2011/0235233 A1 | 9/2011 | Ando et al. |
| 2014/0071586 A1* | 3/2014 | Park ......................... H01G 4/30 |
| | | 156/60 |
| 2017/0025222 A1* | 1/2017 | Park ..................... H01G 4/1209 |
| 2020/0105470 A1 | 4/2020 | Araki |
| 2022/0238276 A1 | 7/2022 | Uchida |

FOREIGN PATENT DOCUMENTS

| | | |
|---|---|---|
| JP | 2021-185638 A | 12/2021 |
| KR | 10-2004-0076596 A | 9/2004 |

OTHER PUBLICATIONS

Extended European Search Report dated Jul. 11, 2024, issued in corresponding European Patent Application No. 23211204.5.

* cited by examiner

MULTILAYER ELECTRONIC COMPONENT

CROSS-REFERENCE TO RELATED APPLICATION(S)

This application claims benefit of priority to Korean Patent Application No. 10-2023-0026712 filed on Feb. 28, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser mounted on the printed circuit boards of various types of electronic products such as imaging devices, including a liquid crystal display (LCD) and a plasma display panel (PDP), computers, smartphones, and mobile phones, and serves to charge or discharge electricity therein or therefrom.

The multilayer ceramic capacitor may be used as a component of various electronic devices due to having a small size, ensuring high capacitance and being easily mounted. With the miniaturization and high output power of various electronic devices such as computers and mobile devices, demand for miniaturization and implementation of high capacitance of multilayer ceramic capacitors has also been increasing.

In general, a body of a multilayer ceramic capacitor may be formed by alternately stacking a dielectric layer including $BaTiO_3$ as a main ingredient and an internal electrode. The body needs to be sintered in a reducing atmosphere, and a material included in the dielectric layer needs to have reduction resistance.

However, due to the inherent properties of an oxide, oxygen in the oxide may escape during sintering in a reducing atmosphere, resulting in oxygen vacancies and electrons, and the movement of oxygen vacancies under a high-temperature and high-pressure condition may cause degradation in insulation resistance of a multilayer ceramic capacitor.

In order to prevent degradation in insulation resistance of the multilayer ceramic capacitor by reducing the movement of oxygen vacancies, a method of suppressing the generation and movement of oxygen vacancies by adding a rare earth element may be considered. However, as a dielectric layer becomes thinner and a use environment for multilayer ceramic capacitors becomes more severe so as to achieve higher capacitance, there is a need for research into a multilayer ceramic capacitor capable of securing a dielectric constant while suppressing degradation in insulation resistance in a high-temperature and high-pressure environment.

SUMMARY

An aspect of the present disclosure provides a multilayer electronic component capable of securing a dielectric constant while suppressing degradation in insulation resistance in a high-temperature and high-pressure environment.

The various and beneficial advantages and effects of the present disclosure are not limited to those set forth herein, and will be more easily understood in the course of describing specific example embodiments.

According to an aspect of the present disclosure, there is provided a multilayer electronic component including a body including a dielectric layer and an internal electrode disposed alternately with the dielectric layer in a first direction, and an external electrode disposed on an outside of the body and connected to the internal electrode. The dielectric layer may include a first layer and a second layer stacked in the first direction, and each of the first layer and the second layer may include Ba, Ti, and Si. $1.5 \leq S2/S1 \leq 3.0$ may be satisfied, when a molar ratio of Si to Ti included in the first layer is referred to as S1 and a molar ratio of Si to Ti included in the second layer is referred to as S2.

According to another aspect of the present disclosure, there is provided a multilayer electronic component including a body including a dielectric layer and an internal electrode disposed alternately with the dielectric layer in a first direction, and an external electrode disposed on an outside of the body and connected to the internal electrode. The dielectric layer may include a first layer and a second layer stacked in the first direction, and the first layer and the second layer may include different contents of Si. $1.2 \leq G1/G2 \leq 2.0$ may be satisfied, when an average size of dielectric grains included in the first layer is referred to as G1 and an average size of dielectric grains included in the second layer is referred to as G2.

According to example embodiments of the present disclosure, a multilayer electronic component may secure a dielectric constant while suppressing degradation in insulation resistance in a high-temperature and high-pressure environment.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
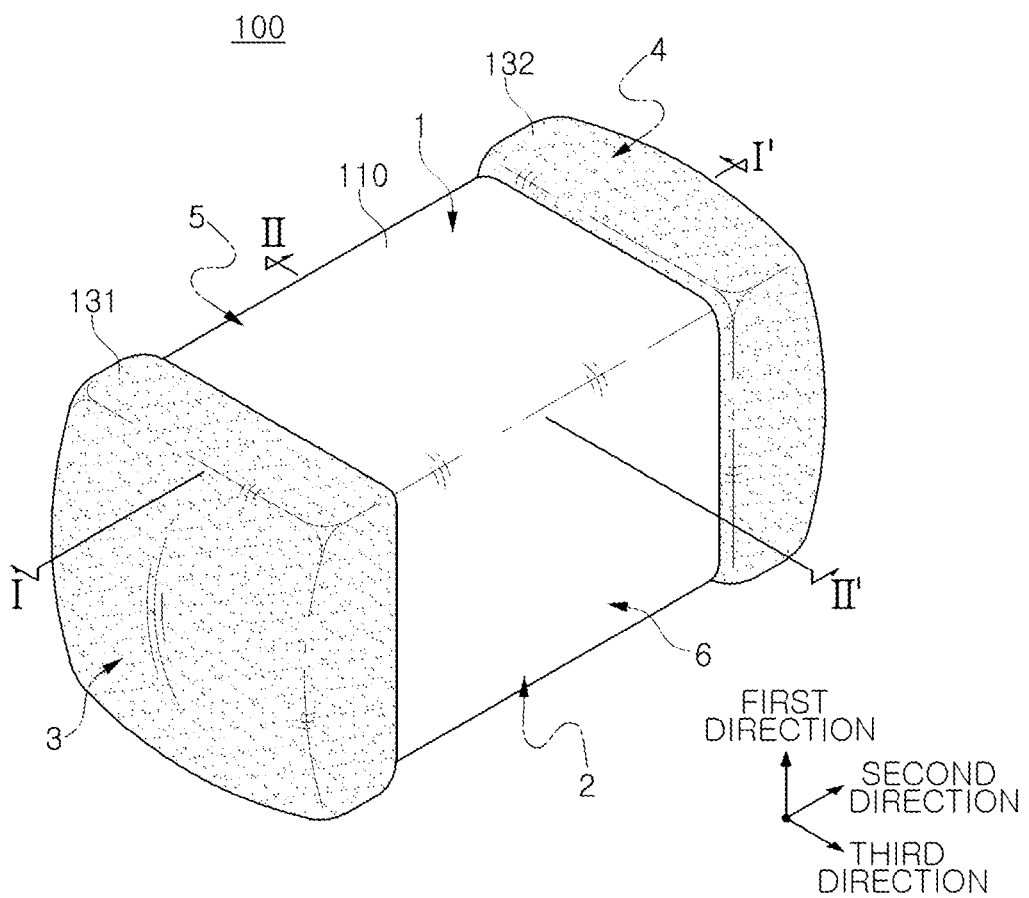
FIG. 1 is a schematic perspective view of a multilayer electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a thickness (T) direction, a second direction may be defined as a length (L) direction, and a third direction may be defined as a width (W) direction.

Multilayer Electronic Component

FIG. 1 is a schematic perspective view of a multilayer electronic component according to an example embodiment of the present disclosure.

Figure 2:
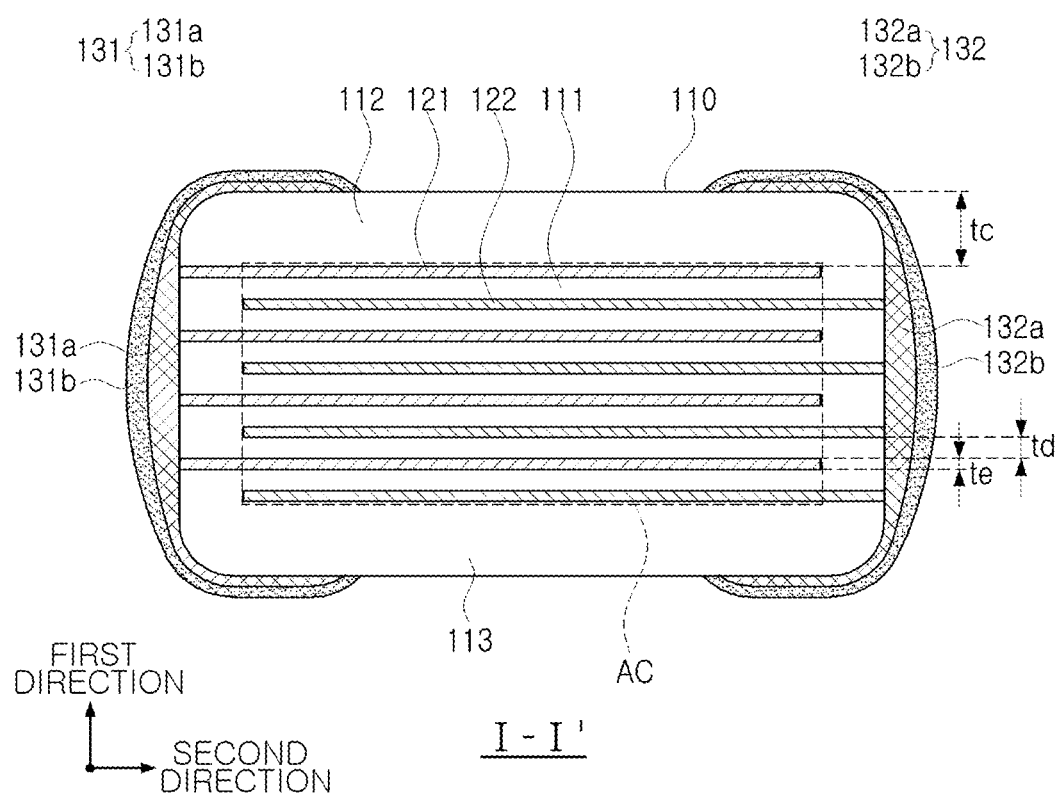
FIG. 2 is a schematic cross-sectional view taken along line I-I' in FIG. 1.

FIG. 2 is a schematic cross-sectional view taken along line I-I' of FIG. 1.

Figure 3:
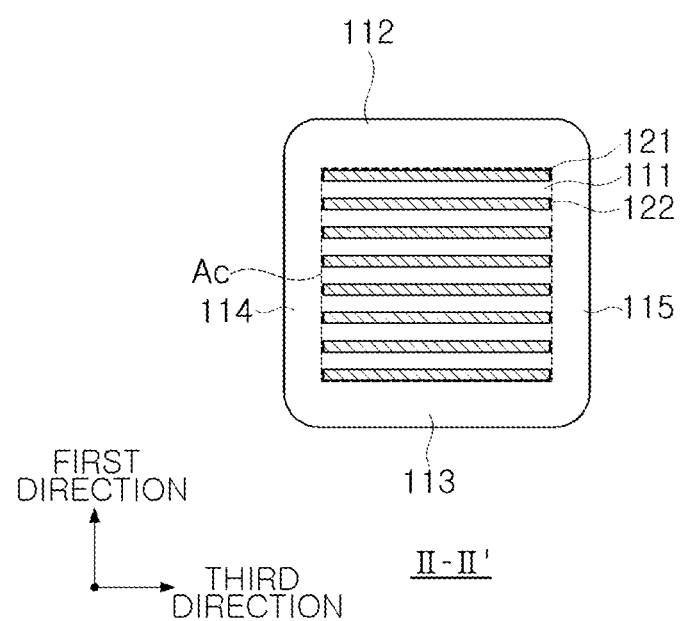
FIG. 3 is a schematic cross-sectional view taken along line II-II' in FIG. 1.

FIG. 3 is a schematic cross-sectional view taken along line II-II' of FIG. 1.

Figure 4:
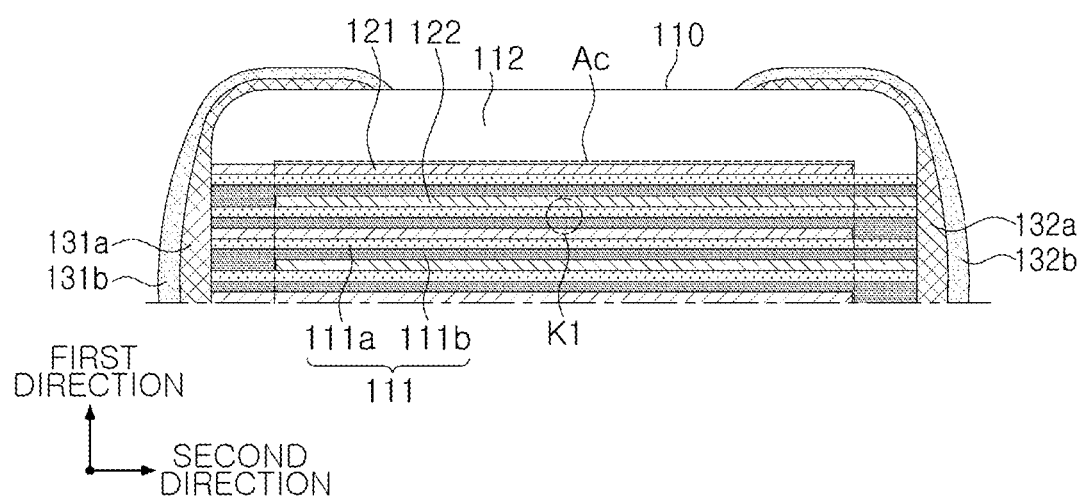
FIG. 4 illustrates a part of the cross-sectional view of FIG. 2 and is a schematic cross-sectional view of a specific configuration of a dielectric layer.

FIG. 4, partially illustrates the cross-sectional view of FIG. 2, is a schematic cross-sectional view of a specific configuration of a dielectric layer.

Figure 5:
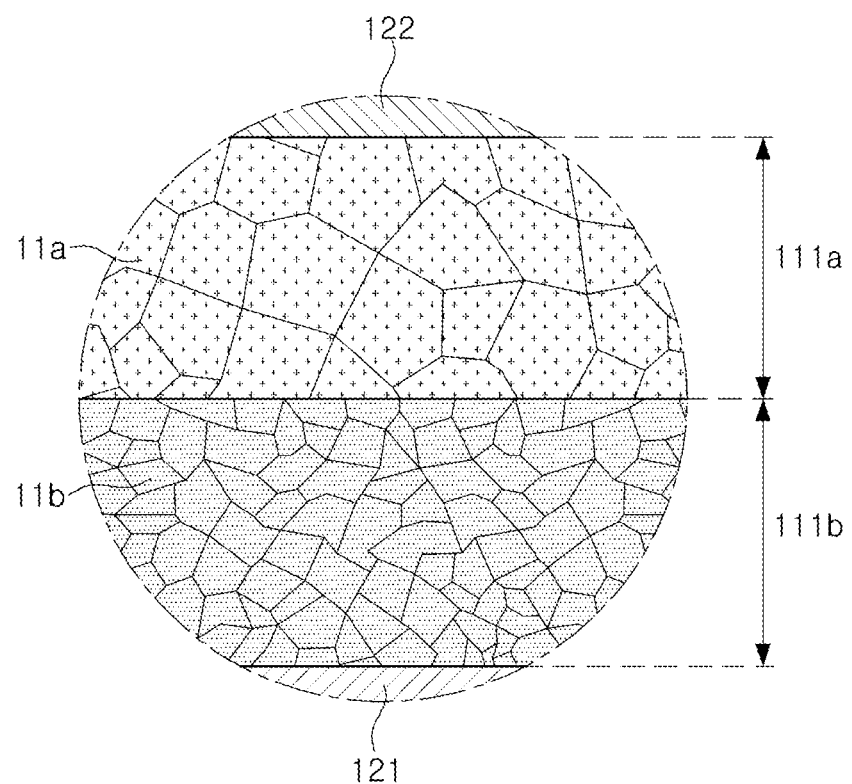
FIG. 5 is an enlarged view of region K1 in FIG. 4.

FIG. 5 is an enlarged view of region K1 in FIG. 4.

Hereinafter, a multilayer electronic component 100 according to an example embodiment of the present disclosure will be described in detail with reference to the drawings. In addition, a multilayer ceramic capacitor is described as an example of the multilayer electronic component, but the present disclosure is not limited thereto, and may be applied to various electronic products, such as inductors, piezoelectric elements, varistors, thermistors, or the like.

A multilayer electronic component 100 according to an example embodiment of the present disclosure may include a body 110 including a dielectric layer 111 and an internal electrode 121 or 122 disposed alternately with the dielectric layer in a first direction, and an external electrode 131 or 132 disposed on the outside of the body and connected to the internal electrode.

A specific shape of the body 110 is not particularly limited. However, as illustrated, the body 110 may have a hexahedral shape or a shape similar thereto. Ceramic powder particles included in the body 110 may shrink during a sintering process, and an edge portion of the body 110 may be polished, such that the body 110 may not have a hexahedral shape having perfectly straight lines, but may have a substantially hexahedral shape.

In the body 110, the dielectric layer 111 and the internal electrode 121 or 122 may be alternately stacked. More specifically, the body 110 may include a capacitance formation portion Ac disposed within the body 110, the capacitance formation portion Ac including first and second internal electrodes 121 and 122 disposed alternately with the dielectric layer 111 interposed therebetween to form a capacitance. A plurality of dielectric layers 111, included in the body 110, may be in a sintered state, and adjacent dielectric layers 111 may be integrated with each other such that boundaries therebetween may not be readily apparent without using a scanning electron microscope (SEM).

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

The dielectric layer 111 may include a first layer 111a and a second layer 111b stacked in the first direction. Each of the first and second layers 111a and 111b may extend in the second direction, intersecting the first direction, such that each of the first and second layers 111a and 111b may have a side surface exposed to the outside of the body 110 in the second direction. That is, the side surfaces of the first and second layers 111a and 111b may be exposed to the outside of the body 110 through the third and fourth surfaces 3 and 4. In addition, the first and second layers 111a and 111b may respectively extend in the third direction, intersecting the first and second directions, such that side surfaces thereof may be exposed to the outside of the body 110 through the fifth and sixth surfaces 5 and 6.

As illustrated in FIG. 4, at least a portion of the second layer 111b may cover one side surface of the internal electrode 121 or 122 in the second direction. In addition, the capacitance formation portion Ac may include a first internal electrode 121, a first layer 111a, a second layer 111b, and a second internal electrode 122 sequentially stacked from top to bottom with respect to the first direction. However, the present disclosure is not limited thereto, and the capacitance formation portion Ac may include the first internal electrode 121, the second layer 111b, the first layer 111a, and the second internal electrodes 122 sequentially stacked from top to bottom with respect to the first direction. In this case, at least a portion of the first layer 111a may cover one side surface of the internal electrode 121 or 122 in the second direction.

The dielectric layer 111 may be formed by preparing a ceramic slurry including ceramic powder particles, an organic solvent, and a binder, coating a carrier film with the slurry and drying the slurry coated on the carrier film to prepare a ceramic green sheet, and then sintering the ceramic green sheet. In addition, the dielectric layer 111 may be formed by sequentially stacking a first ceramic green sheet, forming the first layer 111a, and a second ceramic green sheet, forming the second layer 111b, and then performing sintering thereon. The ceramic powder particles are not particularly limited as long as sufficient capacitance is obtainable therewith. For example, a barium titanate-based material, a lead composite perovskite-based material, or a strontium titanate-based material may be used for the ceramic powder particles. Examples of the ceramic powder particles may include $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, or $Ba(Ti_{1-y}Zr_y)O_3$ $(0<y<1)$ obtained by partially dissolving Ca or Zr in $BaTiO_3$. In addition, as will be described below, various additives added to the first ceramic green sheet and the second ceramic green sheet may have contents different from each other in order to implement reliability and dielectric constant properties of a multilayer electronic component.

According to an example embodiment of the present disclosure, each of the first layer 111a and the second layer 111b may include Ba, Ti, and Si. In addition, the first layer 111a and the second layer 111b may include different contents of Si. For example, when a molar ratio of Si to Ti included in the first layer 111a is S1 and a molar ratio of Si to Ti included in the second layer 111b is S2, S2>S1 may be satisfied.

Si may be one of key elements included in glass required for liquid phase sintering, and a content of Si included in the dielectric layer may affect a total content of liquid phase involved in material transfer during sintering. That is, Si may function as a sintering aid and improve density of dielectric grains included in the dielectric layer, thereby preventing degradation in insulation resistance of the multilayer electronic component in a high-temperature and high-pressure environment.

Accordingly, when Si included in the dielectric layer has an excessively low content, dielectric grains may not be densified, resulting in degradation in insulation resistance of the multilayer electronic component. However, when Si included in the dielectric layer has an excessively high content, an excessive liquid phase may be generated, which may have the side effect of preventing grain growth of the dielectric grains or reducing a dielectric constant.

According to an example embodiment of the present disclosure, in order to appropriately control the content of Si included in the dielectric layer, the dielectric layer 111 may include a first layer 111a and a second layer 111b in which S2>S1 is satisfied. Accordingly, the second layer 111b may serve to improve reliability of the multilayer electronic component by suppressing the movement of oxygen vacancies, and the first layer 111a may serve to prevent a decrease in dielectric constant due to the second layer 111b.

A ratio of S2 to S1 may preferably satisfy $1.5 \leq S2/S1 \leq 3.0$. When $1.5 \leq S2/S1 \leq 3.0$ is satisfied, densification and grain growth of dielectric grains included in the second layer 111b may be simultaneously achieved. When S2/S1 is less than 1.5, the effect of suppressing the movement of oxygen vacancies and improving reliability according to the present disclosure may be insignificant. In addition, when S2/S1 is greater than 3.0, grain growth of the dielectric grains included in the second layer 111b may not be achieved or a density of the dielectric grains included in the second layer 111b may be reduced, thereby reducing a dielectric constant or high-temperature withstand voltage properties. A method of controlling S1 and S2 is not particularly limited, but S1 and S2 may be controlled by adjusting contents of carbonate, oxide and/or glass of a Si element added to each of the first and second ceramic green sheets.

In an example embodiment, when an average size of dielectric grains 11a included in the first layer 111a is referred to as G1 and an average size of dielectric grains 11b included in the second layer 111b is referred to as G2, G1>G2 may be satisfied. That is, the second layer 111b may have a grain boundary fraction higher than that of the first layer 111a, such that the movement of oxygen vacancies may be suppressed using a potential barrier at an interface, thereby preventing degradation in insulation resistance of the multilayer electronic component. In the related art, the dielectric layer may be a single layer, resulting in a decrease in dielectric constant of the multilayer electronic component, as a grain boundary fraction increases. However, according to an example embodiment of the present disclosure, the first layer 111a may serve to secure a dielectric constant of the multilayer electronic component, and the second layer 111b may serve to prevent degradation in insulation resistance of the multilayer electronic component.

A ratio of G1 to G2 may preferably satisfy $1.2 \leq G1/G2 \leq 2.0$. When G1 or G2 has an excessively low content, a dielectric constant of the multilayer electronic component may not be secured. When G1 or G2 has an excessively high content, increased shrinkage may occur due to over-sintering, resulting in cracks or deformation defects or degradation in insulation resistance. That is, when G2 satisfies $1.2 \leq G1/G2 \leq 2.0$, the multilayer electronic component may have a significant effect of preventing degradation in insulation resistance and improving a dielectric constant.

For example, G1 and G2 may refer to average values of dielectric grain sizes obtained, for example, by obtaining, with an SEM, a 50,000× magnified image of the first layer 111a and the second layer 111b in a cross-section of the body 110 in first and second directions obtained by cutting the center of the body 110 in a third direction, or a cross-section of the body 110 in first and third directions obtained by cutting the center of the body 110 in a second direction, and then analyzing the image using an image analysis program, for example, the Zootos program by Zootos Co., Ltd.

A method of controlling G1 and G2 is not particularly limited. For example, when a molar ratio of Ba to Ti included in the first layer is referred to as B1 and a molar ratio of Ba to Ti included in the second layer is referred to as B2, B2>B1 may be satisfied, thereby suppressing grain growth of the dielectric grains 11b included in the second layer 111b, as compared to the dielectric grains 11a included in the first layer 111a. In addition, dispersion of the dielectric grains 11b included in the second layer 111b may be controlled, thereby improving withstand voltage and reliability properties of a multilayer electronic component.

A ratio of B2 to B1 may preferably satisfy $1.002 \leq B2/B1 \leq 1.005$. When B2/B1 is less than 1.002, an effect of controlling grain growth of the dielectric grains 11b included in the second layer 111b may be insignificant. In addition, when B2/B1 is greater than 1.005, pores may increase in the second layer 111b, resulting in a decrease in density.

A method of adjusting of adjusting B1 and B2 is not particularly limited. For example, a molar ratio of Ba to Ti may be increased by adding a Ba additive, such as an oxide and/or carbonate including Ba, to the first and second ceramic green sheets.

In an example embodiment, each of the first layer 111a and the second layer 111b may include a rare earth element. When a molar ratio of the rare earth element to Ti included in the first layer 111a is referred to as R1 and a molar ratio of the rare earth element to Ti included in the second layer 111b is referred to as R2, $0.005 \leq R1 \leq 0.02$ and/or $0.005 \leq R2 \leq 0.02$ may be satisfied. R1 and/or R2 may satisfy the above conditions, such that the movement of oxygen vacancies may be suppressed, thereby improving high-temperature withstand voltage properties of the multilayer electronic component. Here, the rare earth element may include, for example, at least one of Dy, Ho, Tb, Gd, Er, Y, and Yb.

In an example embodiment, the dielectric layer 111 may include at least one of Al and Mg. For example, each of the first layer 111a and the second layer 111b may include at least one of Al and Mg. Al and Mg may be key elements involved in liquid phase sintering, along with Ba and Si, and may serve to control sintering temperature of the dielectric layer 111.

Contents of elements (such as Ba, Ti, Si, and a rare earth element) and S1, S2, B1, B2, R1, and R2 included in the first layer 111a and the second layer 111b may be measured by the following method, but the present disclosure is not limited thereto. First, the body 110 may be polished to the center of the third direction to expose the cross sections of the body in the first and second directions, and then a thinned analysis sample of the dielectric layer 111 may be prepared using a focused ion beam (FIB) instrument. Thereafter, a damaged layer on a surface of the thinned sample may be removed using Ar ion milling, and the thinned sample may then be subjected to mapping and quantitative analysis of each element in an image obtained using STEM-EDS. In this case, a quantitative analysis graph of each element may be obtained in terms of mass fraction (wt %) of each element, which may be converted to a molar content (mol %). Finally, S1, S2, B1, B2, R1 and R2 may be measured by measuring a molar ratio of Si, Ba and the rare earth element to Ti.

An average thickness (td) of the dielectric layer 111 is not particularly limited, but may be, for example, 0.1 μm or more and 6.0 μm or less. Here, the average thickness (td) of the dielectric layer 111 may refer to a size of the dielectric layer 111 in the first direction disposed between the internal electrodes 121 and 122. The average thickness of the dielectric layer 111 may be measured by scanning, with an SEM, a cross-section of the body 110 in first and second directions at a magnification of 10,000. More specifically, thicknesses of a plurality of points of one dielectric layer 111, for example, thirty points equally spaced apart from each other in a second direction, may be measured to measure an average value thereof. The thirty equally spaced points may be designated in a capacitance formation portion Ac. In addition, when such average value measurement is performed on ten dielectric layers 111, the average thickness of the dielectric layer 111 may be further generalized.

The internal electrode 121 or 122 may be disposed alternately with the dielectric layer 111. For example, the first internal electrode 121 and the second internal electrode 122, a pair of electrodes having different polarities, may be disposed to oppose each other with the dielectric layer 111 interposed therebetween. The first internal electrode 121 and the second internal electrode 122 may be electrically isolated from each other by the dielectric layer 111 interposed therebetween.

The first internal electrode 121 may be disposed to be spaced apart from the fourth surface 4, and may have an end exposed to the third surface 3. In addition, the second internal electrode 122 may be disposed to be spaced apart from the third surface 3, and may have an end exposed to the fourth surface 4.

Conductive metal included in the internal electrode 121 or 122 may be at least one of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrode 121 or 122 may be formed by printing a conductive paste for an internal electrode including conductive metal to a predetermined thickness on a ceramic green sheet, and then performing sintering thereon. A method of printing the conductive paste may include a screen-printing method, a gravure-printing method, or the like, but the present disclosure is not limited thereto.

An average thickness (te) of the internal electrode 121 or 122 is not particularly limited, but may be, for example, 0.4 μm or more and 1.0 μm or less. Here, the average thickness (te) of the internal electrode 121 or 122 may refer to a size of the internal electrode 121 or 122 in a first direction. Here, the average thickness (te) of the internal electrode 121 or 122 may be measured by scanning, with an SEM, a cross-section of the body 110 in first and second directions at a magnification of 10,000. More specifically, thicknesses of a plurality of points of one internal electrode 121 or 122, for example, thirty points equally spaced apart from each other in a second direction, may be measured to measure an average value thereof. The thirty equally spaced points may be designated in a capacitance formation portion Ac. In addition, when such average value measurement is performed on ten internal electrodes 121 or 122, the average thickness of the internal electrode 121 or 122 may be further generalized.

The body 110 may include a first cover portion 112 and a second cover portion 113 respectively disposed on both end surfaces of the capacitance formation portion Ac opposing each other in a first direction. The cover portion 112 or 113 may basically serve to prevent damage to the internal electrode due to physical or chemical stress. The cover portion 112 or 113 may have a configuration the same as the dielectric layer 111, except that the internal electrode is not included.

A thickness of the cover portion 112 or 113 is not particularly limited. However, the thickness of the cover portion 112 or 113 may be 20 μm or less for miniaturization and implementation of high capacitance of the multilayer electronic component. Here, an average thickness of the cover portion 112 or 113 may refer to an average thickness of each of the first cover portion 112 and the second cover portion 113.

The average thickness of the cover portion 112 or 113 may refer to an average size of the cover portion 112 or 113 in a first direction, and may be an average value of sizes of the cover portion 112 or 113 in a first direction measured at five equally spaced points on a cross-section of the body 110 in first and second directions.

The body 110 may include a first margin portion 114 and a second margin portion 115 respectively disposed on both surfaces of the capacitance formation portion Ac opposing each other in a third direction. That is, the margin portion 114 or 115 may refer to a region between both ends of the internal electrode 121 or 122 and a boundary surface of the body 110 in a cross-section of the body 110 obtained by cutting the body 110 in first and third directions.

The margin portion 114 or 115 may include a material the same as that of the dielectric layer 111, except that the internal electrode 121 or 122 is not included. The margin portion 114 or 115 may basically serve to prevent damage to the internal electrode 121 or 122 by physical or chemical stress.

The margin portion 114 or 115 may be formed by coating a ceramic green sheet with a conductive paste for an internal electrode, except for a portion of the ceramic green sheet on which a margin portion is to be formed. Alternatively, in order to suppress a step caused by the internal electrode 121 or 122, the internal electrodes 121 and 122 may be stacked on each other and then cut to be exposed to the fifth and sixth surfaces 5 and 6 of the body, and then a single dielectric layer or two or more dielectric layers may be stacked on both surfaces of the capacitance formation portion Ac opposing each other in a third direction to form the margin portion 114 or 115.

An average thickness of the margin portion 114 or 115 is not particularly limited. However, the average thickness of the margin portion 114 or 115 may be 20 μm or less for miniaturization and implementation of high capacitance of the multilayer electronic component. Here, the average thickness of the margin portion 114 or 115 may refer to an average thickness of each of the first margin portion 114 and the second margin portion 115.

The average thickness of the margin portion 114 or 115 may refer to an average size of the margin portion 114 or 115 in a third direction, and may be an average value of sizes of the margin portion 114 or 115 in a third direction measured at five equally spaced points on a cross-section of the body 110 in first and third directions.

The external electrodes 131 and 132 may be disposed on the third and fourth surfaces 3 and 4 of the body 110, and may extend onto the first, second, fifth and sixth surfaces. In addition, the external electrodes 131 and 132 may include a first external electrode 131 connected to the first internal electrode 121 and a second external electrode 132 connected to the second internal electrode 122.

The external electrodes 131 and 132 may include base electrode layers 131a and 132a disposed on the third and fourth surfaces 3 and 4 of the body 110 and connected to the internal electrodes 121 and 122, and plating layers 131b and 132b disposed on the base electrode layers. That is, the first external electrode 131 may include a first base electrode layer 131a disposed on the third surface and connected to the first internal electrode 121, and the second external electrode 132 may include a second base electrode layer 132a disposed on the fourth surface and connected to the second internal electrode 122.

The base electrode layer 131a or 132a may include, for example, a first electrode layer including metal and glass. The first electrode layer may be formed by dipping the third and fourth surfaces 3 and 4 of the body 110 in a conductive paste including metal and glass, and then performing sintering thereon. The metal included in the first electrode layer may include copper (Cu), nickel (Ni), palladium (Pd), platinum (Pt), gold (Au), silver (Ag), lead (Pb), and/or alloys thereof, but the present disclosure is not limited thereto.

The base electrode layer 131a or 132a may include, for example, a second electrode layer including metal and resin. The second electrode layer may be formed by applying and curing a paste including metal and resin. The metal included in the second electrode layer may include copper (Cu), nickel (Ni), palladium (Pd), platinum (Pt), gold (Au), silver (Ag), lead (Pb), and/or alloys thereof. The resin included in the second electrode layers may be an insulating resin, and is not particularly limited. For example, the resin may include, but is not limited to, an epoxy resin.

The base electrode layer 131a or 132a may be a single layer including the first electrode layer, may be a single layer including the second electrode layer, or may have a form in which the first electrode layer and the second electrode layer are sequentially stacked.

The plating layer 131b or 132b may improve mounting properties. A type of the plating layer 131b or 132b is not particularly limited, and may be a plating layer including nickel (Ni), tin (Sn), palladium (Pd), and/or alloys thereof, and may be formed as a plurality of layers. The plating layer 131b or 132b may be, for example, a nickel (Ni) plating layer or a tin (Sn) plating layer, and may have a form in which a nickel (Ni) plating layer and a tin (Sn) plating layer are sequentially formed. In addition, the plating layer 131b or 132b may include a plurality of nickel (Ni) plating layers and/or a plurality of tin (Sn) plating layers.

In the drawings, a structure is illustrated in which the multilayer electronic component 100 has two external electrodes 131 and 132, but the present disclosure is not limited thereto, and the number and shape of the external electrodes 131 and 132 may be changed depending on a shape of the internal electrode 121 or 122 or other purposes.

Experimental Example

First, a ceramic slurry including $BaTiO_3$-based powder particles, an organic solvent, additives such as $BaCO_3$ and $SiO_2$, and a binder was prepared, and a ceramic green sheet was prepared by coating a carrier film with the slurry and drying the carrier film coated with the slurry. Then, a conductive paste for an internal electrode including Ni powder particles, an organic solvent, and a binder was printed on the ceramic green sheet to form an internal electrode pattern. A plurality of ceramic green sheets having the internal electrode pattern were stacked and sintered to form a body of Sample No. 1, including a dielectric layer and an internal electrode. In this case, a dielectric layer of Sample No. 1 included only a first layer having a molar ratio of Si to Ti referred to as S1 and a molar ratio of Ba to Ti referred to as B1.

Subsequently, a body of Sample No. 2 was formed in the same manner. However, contents of $BaCO_3$ and $SiO_2$ added to a ceramic slurry may be adjusted such that a dielectric layer of Sample No. 2 had a molar ratio of Si to Ti of 1.5×S1 or more and 3.0×S1 or less, and a molar ratio of Ba to Ti of 1.002×B1 or more and 1.005×B1 or less. That is, the dielectric layer of Sample No. 2 included only the second layer described above.

In addition, bodies of Sample Nos. 3 to 5 were formed in the same manner as that of Sample No. 1. However, contents of $BaCO_3$ and $SiO_2$ added to a ceramic slurry were adjusted such that a molar ratio of Si to Ti and a molar ratio of Ba to Ti in dielectric layers of Sample Nos. 3 to 5 had values listed in Table 1 below.

Thereafter, the bodies of Sample Nos. 1 to 5 were dipped in a conductive paste for an external electrode including Cu and glass and sintered to form a base electrode layer, and a plating layer was formed on the base electrode layer to form a sample chip.

Subsequently, a highly accelerated life time test (HALT) was performed on 40 sample chips for each sample number at a temperature of 125° C. and a voltage of 12.6 V, and a mean time to failure (MTTF) was calculated by measuring time in which a failure occurs, and a dielectric constant of each sample number was measured using an LCR meter, and listed in Table 1.

TABLE 1

| Sample No. | Si/Ti Molar Ratio | Ba/Ti Molar Ratio | MTTF (hr) | Dielectric Constant |
|---|---|---|---|---|
| 1 | S1 | B1 | 90 | 3400 |
| 2 | 1.5 × S1 ≤ Si/Ti ≤ 3.0 × S1 | 1.002 × B1 ≤ Ba/Ti ≤ 1.005 × B1 | 135 | 3000 |
| 3 | 1.5 × S1 ≤ Si/Ti ≤ 3.0 × S1 | Ba/Ti < 1.002 × B1 | 106 | 3200 |
| 4 | 1.5 × S1 ≤ Si/Ti ≤ 3.0 × S1 | Ba/Ti > 1.005 × B1 | 116 | 2800 |
| 5 | Si/Ti > 3.0 × S1 | 1.002 × B1 ≤ Ba/Ti ≤ 1.005 × B1 | 41 | 2500 |

Referring to Table 1 above, it can be confirmed that Sample No. 1 has an excellent dielectric constant as compared to the other sample numbers, but has slightly poor reliability. It can be confirmed that Sample No. 2 has a slightly lower dielectric constant as compared to sample number 1, but has excellent reliability as compared to the other sample numbers. This may be because a molar ratio of Si to Ti in the second layer satisfying 1.5×S1 or more and 3.0×S1 or less and a molar ratio of Ba to Ti in the second layer satisfying 1.002×B1 or more and 1.005×B1 or less implement densification of dielectric grains in the second layer and suppress grain growth of the dielectric grains in the second layer, thereby preventing the movement of oxygen vacancies to improve reliability.

It can be confirmed that a dielectric layer of Sample No. 3, having a molar ratio of Ba to Ti of less than 1.002×B1, exhibits an insignificant effect of controlling grain growth of dielectric grains, and thus exhibits poor reliability as compared to Sample No. 2. In addition, it can be confirmed that a dielectric layer of Sample No. 4, having a molar ratio of Ba to Ti of greater than 1.005×B1, exhibits poor reliability due to increased pores and a decrease in dielectric constant due to excessive grain growth suppression. It can be confirmed that a dielectric layer of Sample No. 5, having a molar ratio of Si to Ti of more than 3.0×S1, exhibits a decrease in density, and thus exhibits a sharp drop in reliability.

That is, referring to Table 1 above, it can be confirmed that a dielectric layer, including a first layer having a most excellent dielectric constant and a second layer having most excellent reliability, may improve reliability of a multilayer electronic component while preventing a decrease in dielectric constant.

While example embodiments have been illustrated and described above, it will be apparent to those skilled in the art that modifications and variations could be made without departing from the scope of the present disclosure as defined by the appended claims.

In addition, the term "an example embodiment" used herein does not refer to the same example embodiment, and is provided to emphasize a particular feature or characteristic different from that of another example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

The terms used herein is for the purpose of describing particular example embodiments only and is not to be limiting of the example embodiments. As used herein, the singular forms "a," "an," and "the" are intended to include the plural forms as well, unless the context clearly indicates otherwise.

What is claimed is:

1. A multilayer electronic component comprising:
a body including a plurality of dielectric layers and a plurality of internal electrodes disposed alternately with the plurality of dielectric layers in a first direction; and
an external electrode disposed on an outside of the body and connected to the plurality of internal electrodes,
wherein at least one of the plurality of dielectric layers includes a first layer and a second layer stacked in the first direction, and each of the first layer and the second layer includes Ba, Ti, and Si,
wherein the body comprises a capacitance formation portion, and the first layer and the second layer are disposed in the capacitance formation portion, and
$1.5 \leq S2/S1 \leq 3.0$ is satisfied, when a molar ratio of Si to Ti included in the first layer is referred to as S1 and a molar ratio of Si to Ti included in the second layer is referred to as S2.

2. The multilayer electronic component of claim 1, wherein G1>G2 is satisfied, when an average size of dielectric grains included in the first layer is referred to as G1 and an average size of dielectric grains included in the second layer is referred to as G2.

3. The multilayer electronic component of claim 2, wherein G1 and G2 satisfy $1.2 \leq G1/G2 \leq 2.0$.

4. The multilayer electronic component of claim 1, wherein $1.002 \leq B2/B1 \leq 1.005$ is satisfied, when a molar ratio of Ba to Ti included in the first layer is referred to as B1 and a molar ratio of Ba to Ti included in the second layer is referred to as B2.

5. The multilayer electronic component of claim 1, wherein
each of the first layer and the second layer further includes a rare earth element, and
$0.005 \leq R1 \leq 0.02$ and/or $0.005 \leq R2 \leq 0.02$ are satisfied, when a molar ratio of the rare earth element to Ti included in the first layer is referred to as R1 and a molar ratio of the rare earth element to Ti included in the second layer is referred to as R2.

6. The multilayer electronic component of claim 5, wherein the rare earth element includes at least one of Dy, Ho, Tb, Gd, Er, Y, and Yb.

7. The multilayer electronic component of claim 1, wherein the dielectric layer further includes at least one of Al and Mg.

8. The multilayer electronic component of claim 1, wherein an average thickness of the plurality of dielectric layers is 0.1 μm or more and 6.0 μm or less.

9. The multilayer electronic component of claim 1, wherein each of the first layer and the second layer extends in a second direction, intersecting the first direction, and has a side surface contacting the external electrode in the second direction.

10. The multilayer electronic component of claim 9, wherein at least a portion of the second layer covers one side surface of the plurality of internal electrodes in the second direction.

11. The multilayer electronic component of claim 1, wherein the first layer and the second layer are in direct contact.

12. The multilayer electronic component of claim 11, wherein $1.2 \leq G1/G2 \leq 2.0$ is satisfied, when an average size of dielectric grains included in the first layer is referred to as G1 and an average size of dielectric grains included in the second layer is referred to as G2.

13. A multilayer electronic component comprising:
a body including a plurality of dielectric layers and a plurality of internal electrodes disposed alternately with the dielectric layer in a first direction; and
an external electrode disposed on an outside of the body and connected to the plurality of internal electrodes,
wherein the plurality of dielectric layers includes a first layer and a second layer stacked in the first direction, and the first layer and the second layer include different contents of Si,
wherein the body comprises a capacitance formation portion, and the first layer and the second layer are disposed in the capacitance formation portion,
$1.2 \leq G1/G2 \leq 2.0$ is satisfied, when an average size of dielectric grains included in the first layer is referred to as G1 and an average size of dielectric grains included in the second layer is referred to as G2, and
the first layer and the second layer further include Ti and Ba, and B2>B1 is satisfied, when a molar ratio of Ba to Ti included in the first layer is referred to as B1 and a molar ratio of Ba to Ti included in the second layer is referred to as B2.

14. The multilayer electronic component of claim 13, wherein the first layer and the second layer further include Ti, and S2>S1 is satisfied, when a molar ratio of Si to Ti included in the first layer is referred to as S1 and a molar ratio of Si to Ti included in the second layer is referred to as S2.

15. The multilayer electronic component of claim 13, wherein the first layer and the second layer further include Ti and Ba, and $1.002 \leq B2/B1 \leq 1.005$ is satisfied.

16. The multilayer electronic component of claim 13, wherein
each of the first layer and the second layer further includes Ti and a rare earth element, and
$0.005 \leq R1 \leq 0.02$ and/or $0.005 \leq R2 \leq 0.02$ are satisfied, when a molar ratio of the rare earth element to Ti included in the first layer is referred to as R1 and a molar ratio of the rare earth element to Ti included in the second layer is referred to as R2.

17. The multilayer electronic component of claim 13, wherein the first layer and the second layer are in direct contact.

* * * * *